Nov. 1, 1966 S. W. ROSE ET AL 3,283,071
METHOD OF EXAMINING X-RAYS
Filed June 4, 1963 3 Sheets-Sheet 1

INVENTORS
Samuel W. Rose
BY Frank E. Bullard.
Attys.

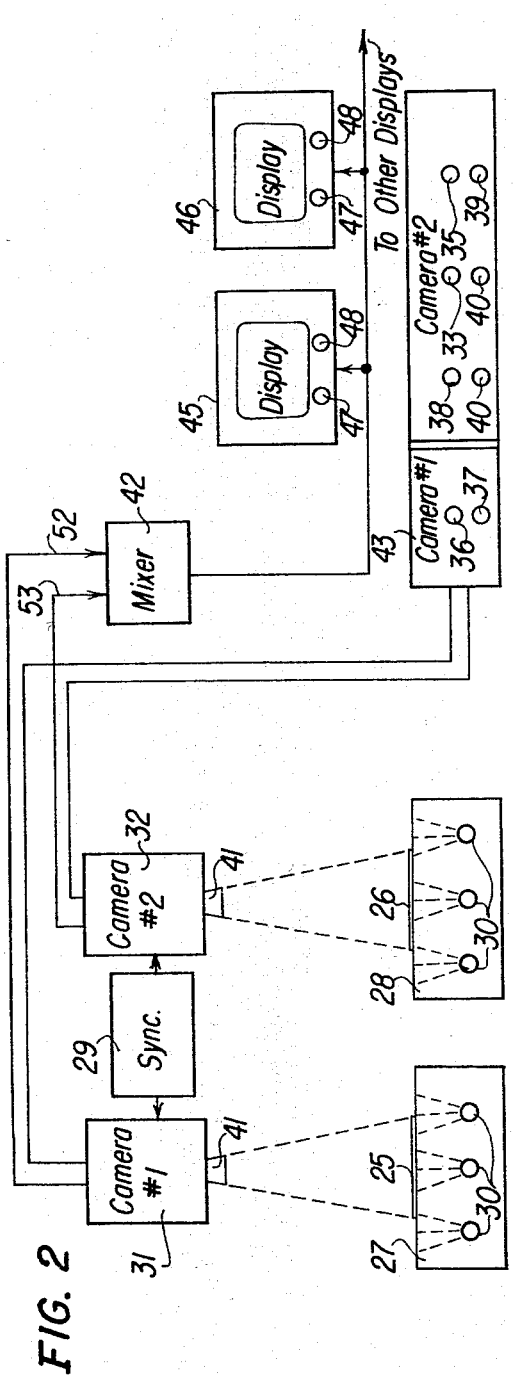
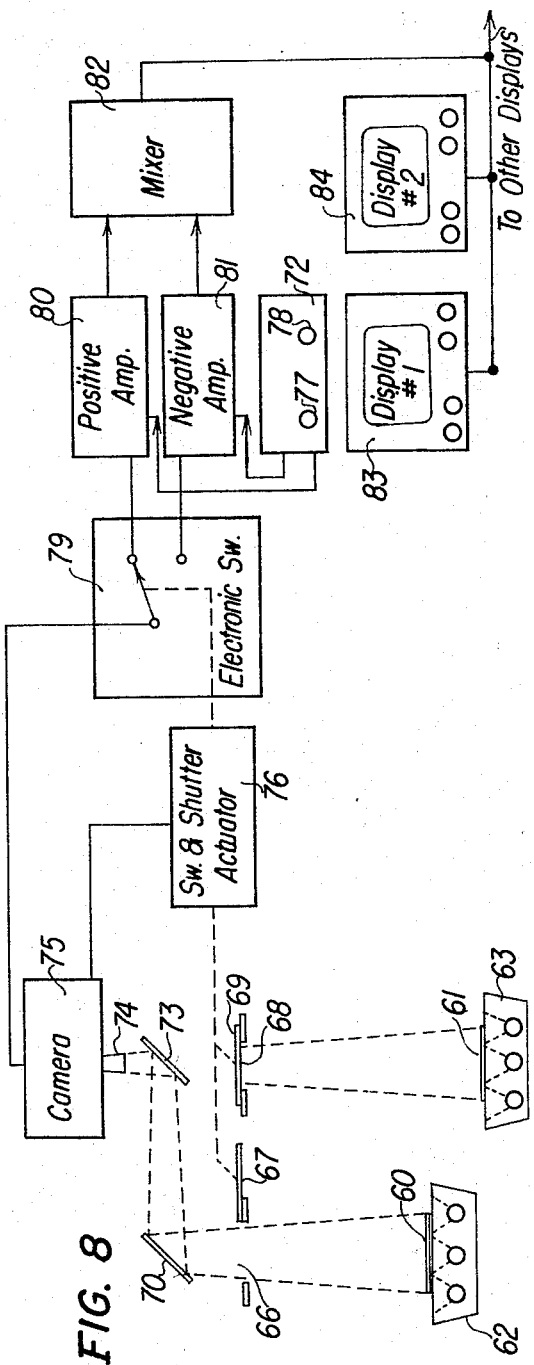
FIG. 2
FIG. 8
INVENTORS
Samuel W. Rose
Frank E. Bullard.
BY Mueller & Aichele
Attys.

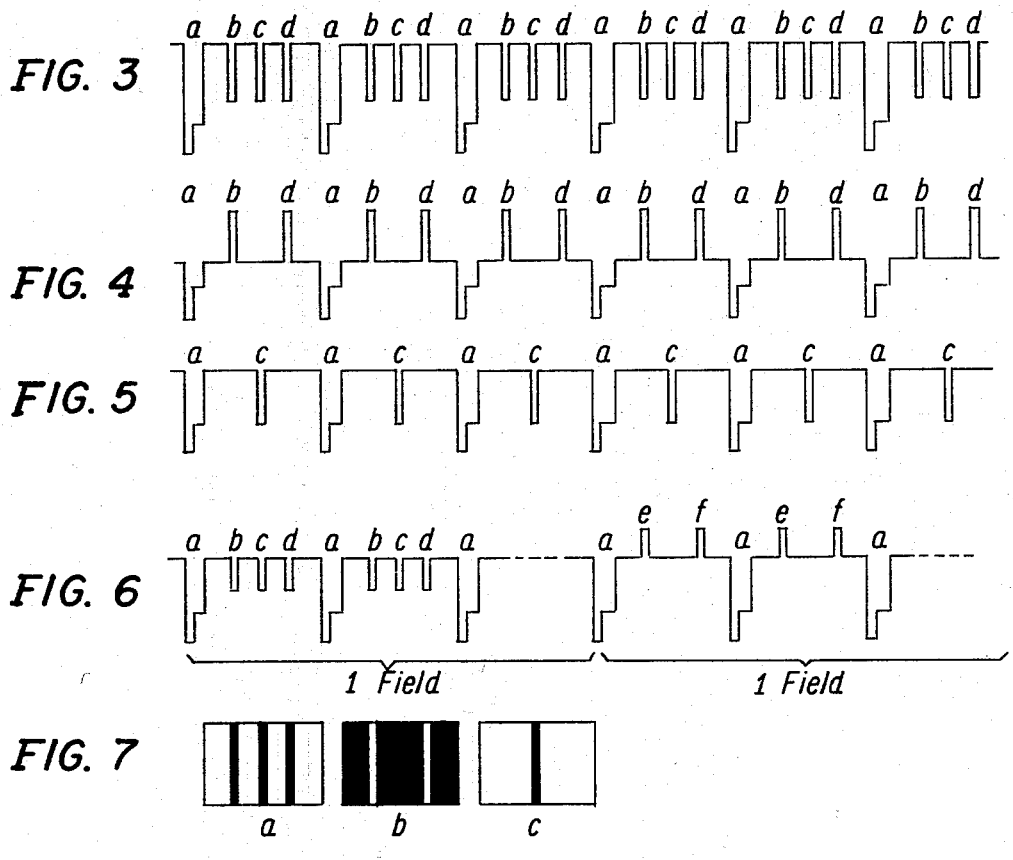

United States Patent Office 3,283,071
Patented Nov. 1, 1966

3,283,071
METHOD OF EXAMINING X-RAYS
Samuel W. Rose, Forest Park, and Frank E. Bullard, Hillside, Ill., assignors to Motorola, Inc., Franklin Park, Ill., a corporation of Illinois
Filed June 4, 1963, Ser. No. 285,395
4 Claims. (Cl. 178—6.8)

This invention relates to a system and method for examining X-ray pictures by the use of closed circuit television, and in particular to the examination of two or more X-ray images simultaneously wherein portions of the picture which are common are cancelled out.

In a medical examination procedure known as the Substraction Technique, X-ray pictures are taken before and after the injection of a contrast medium into the subject of the examination to outline desired portions of the subject. One of the X-ray negatives thus obtained is printed as a positive and precisely superimposed on the other negative. The two films are firmly taped together and a print is made of the combination. As a result of this superposition the areas of the final print which are common to both the positive and negative are reduced to gray while the areas outlined by the contrast material, which appears on only one X-ray photograph, will be darker or lighter than the background gray.

In order to obtain good results the positive must be of the correct density. It has been difficult to get satisfactory positives and final prints except by a trial and error procedure which may require the processing of several films. Also the resulting pictures may not be of the correct contrast throughout and therefore, in order to examine the entire X-ray picture, several prints may be necessary. Registration of the two prints is difficult to achieve using this photographic technique. As a result of the many problems involved in obtaining satisfactory positives and final prints, a large amount of time may be required to make an examination by means of this X-ray technique.

Accordingly, it is an object of this invention to provide a system of comparing X-ray pictures electronically so that areas common to each of the pictures being examined can be effectively cancelled out and areas not common to all the pictures will stand out.

A further object of this invention is to provide a means whereby the registration of superimposed X-rays images can be precisely controlled.

Another object of this invention is to provide electronic means for reversing an X-ray image to form a negative image, and for controlling the contrast and density of the X-ray image.

A further object of this invention is to provide means for reproduction of superimposed X-ray images at a plurality of separate locations.

Another object of this invention is to provide means to magnify selected areas of an X-ray image.

A feature of this invention is the provision of television cameras positioned to convert X-ray negatives to electrical signals and wherein the signals are combined and the resulting signals are displayed on a television monitor.

Another feature of this invention is the provision of a television system which reverses the electrical output of a television camera to form an electrical signal giving a positive image of an X-ray negative.

A further feature of this invention is the provision of a system and method for combining the electrical outputs of two or more television cameras to form a single signal wherein areas common to each of the pictures viewed by the cameras are reduced to a common signal level. The apparatus includes provisions for making mechanical and electrical adjustments to control the superposition of the images being compared.

Another feature of this invention is the provision of a television system as described whereby the density and contrast of the resulting composite picture is controlled by changing the electrical signals representing the individual and combined pictures.

Another feature of this invention is the provision of a plurality of display monitors whereby the resulting picture can be viewed at different locations simultaneously.

Another feature of this invention is the provision of a system of mechanical shutters and mirrors wherein one television camera alternately views two or more pictures, and the signals resulting from the different pictures are combined.

Another feature of this invention is the provision of a system wherein two or more pictures are alternately viewed by one television camera by sequentially illuminating the picture with a stroboscopic light, and the signals resulting from the pictures are combined.

Yet another feature of this invention is the provision of a television system which magnifies by optical means selected portion of X-ray photographs which are being compared.

The invention is illustrated in the drawings wherein:

FIG. 2 is a block diagram exemplifying one form of the invention using two television cameras;

FIG. 3 illustrates the wave form of the output signal from one camera of a two camera system;

FIG. 4 illustrates the wave form of the output of the second camera of a two camera system;

FIG. 5 illustrates the wave form of the combined signals of FIGS. 3 and 4;

FIG. 6 illustrates the wave form of the output signal from a single camera system;

FIG. 7 illustrates the pictures on the display monitor resulting from the wave forms shown in FIGS. 3, 4, 5 and 6;

FIG. 8 illustrates a second embodiment of the invention wherein one camera is used.

In the system and method of examining X-ray images of this invention, the images are obtained by taking X-ray photographs before and after the injection of a contrast medium into a subject. The resulting X-ray negatives are converted to electrical signals simultaneously by two television cameras mounted so that each can view one of the negatives. The output of one television camera is reversed from its normal polarity so that it produces a "negative" picture. The resulting electrical signals from the two cameras are combined in a mixer and the composite electrical signal thus obtained is displayed on a cathode ray picture tube. By properly adjusting the intensities and contrast of the electrical signals and by properly registering the photographs on the camera tubes, the common portions of the two photographs being examined can be reduced to a substantially uniform gray area, while those portions of the negatives which are not common to both can be made to stand out as either a darker or lighter tone.

Another form of the invention uses a single camera for viewing the X-ray images sequentially and displaying the resulting signal in rapid sequence on a cathode ray picture tube. In the resulting display of a rapid sequence of positive and negative pictures the common parts will be seen as a gray area, while those parts not common to all of the photographs will be seen in either a darker or lighter tone depending upon which image is reversed.

The normal output of a television camera can be called a positive picture in that when the electrical signal generated by the television camera is converted to a picture by a television monitor, the tones produced have the same relationship as the tones in the original picture being viewed by the television camera, that is, the dark tones appear dark and the light tones appear light. By reversing the output polarity of the electrical signal generated by a television camera a negative picture is developed in which the tones reproduced by the television monitor are reversed from those viewed by the camera, that is, the dark tones appear light and the light tones appear dark.

Figure 1:
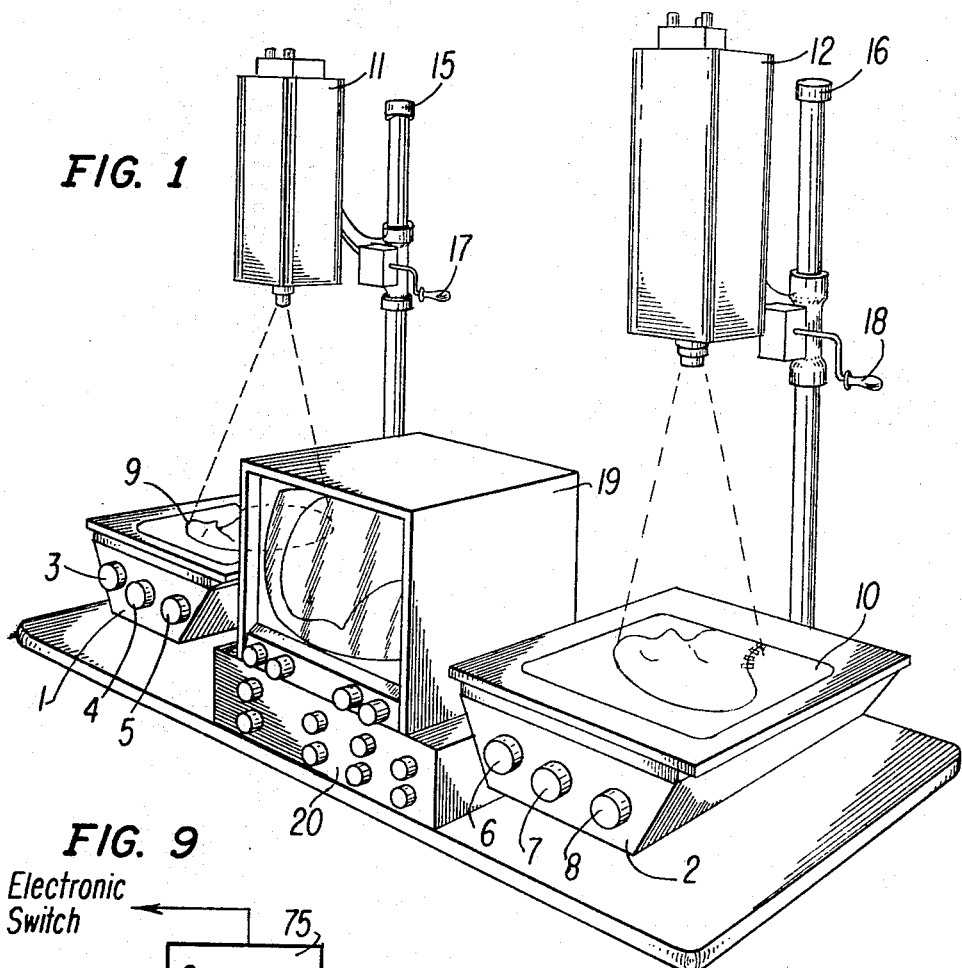
FIG. 1 is a perspective view of the invention showing the location of the X-ray images to be compared in relation to the TV cameras and monitor.

FIG. 1 is a perspective view of one form of the device used in this method of examining X-ray images. Television cameras 11 and 12 are mounted on support posts 15 and 16 where they can view X-ray pictures 9 and 10. X-ray picture 9 is placed on the top surface of light box 1 and X-ray picture 10 is located on the top of light box 2. The light boxes illuminate the X-ray pictures from below providing a uniform illumination throughout the picture. Each light box contains three controls, numbered 3, 4, 5, 6, 7 and 8 which are used to obtain proper registration of the negatives. Controls 3 and 6 move the X-ray picture forward and backward, controls 4 and 7 move the X-ray pictures from side to side, and controls 5 and 8 rotate the X-ray picture in the horizontal plane. Cameras 11 and 12 can be raised and lowered by means of controls 17 and 18. By means of these controls the X-ray pictures can be positioned so that in the resulting composite image the two pictures will be exactly superimposed.

The output signal from one of the two cameras is reversed from its normal polarity thus presenting a "negative" picture. The electrical signals from the two cameras 11 and 12 are combined and displayed by monitor 19. Control panel 20 provides controls for adjusting the individual signals from the cameras. By proper adjustment of the camera and monitor controls the portions of the two pictures which are common can be reduced to a substantially gray area, while the portions which are not common to the two pictures will stand out as either a dark or light area depending upon which camera signal is reversed.

FIG. 2 shows a block diagram of the camera system illustrated in FIG. 1. The X-ray pictures 25 and 26 are placed on top of the light boxes 27 and 28 and are uniformly illuminated over their surface. Cameras 31 and 32 are mounted in a position to view the X-ray pictures 25 and 26. The lenses 41 of cameras 31 and 32 focus the X-ray negatives 25 and 26 on the pick up tubes located inside cameras 31 and 32. These tubes convert the X-ray negatives into electrical signals. Camera lenses 41 can be of fixed focal length or adjustable focal length to provide for magnification of selected portions of the X-ray images which are to be compared. One of the two cameras used in this configuration is a standard television camera while the other has been modified to produce a negative picture. The camera producing the negative picture will produce the same electrical signal as if it were a standard camera and were viewing a positive print of the X-ray negative. Thus the television camera electronically produces the positive print formerly produced by the photographic process.

The resulting signals from cameras 31 and 32 are combined in a mixer 42 which forms a composite electrical signal. The controls are adjusted so that areas of the two X-ray negatives which are similar produce equivalent electrical signals but reversed in polarity so that when they are mixed the resulting composite signal has a relatively uniform amplitude except at those portions of the picture where the X-ray negatives are not similar. The resulting composite electrical signal is connected to the display monitors 45 and 46, which can be standard television receivers minus the radio and intermediate frequency portion, where the picture is displayed for viewing. The composite signal from mixer 42 can be connected to one or more display monitors located at remote points by means of suitable coupling lines and amplifiers.

Registration of the superimposed images is important to the successful use of this technique. When using photographic film there is little control, other than careful handling, over the relative size of the two pictures which are superimposed. If the film shrinks unevenly or distorts in any way additional prints must be made until a satisfactory result is obtained. In the method which is the subject of this invention precise control is available to achieve the degree of registration necessary for the successful use of the subtraction technique. The relative size of the two images can be adjusted by raising and lowering the cameras shown as 11 and 12 in FIG. 1 by means of cranks 17 and 18 or by changing the focal length of the lenses if adjustable focal length lenses are used. The X-ray negatives can also be mechanically positioned on the light boxes 9 and 10 by means of controls 3, 4, 5, 6, 7 and 8 described above. In addition to these mechanical controls registration can be further perfected by means of electrical controls on the cameras. These controls are shown in FIG. 2 on control panel 43. By means of controls 35 and 39 the width and height of the picture in camera 32 can be controlled so that the resulting picture is substantially identical in size to the picture produced by camera 31. Controls 33 and 34 center the resulting picture so that it will be superimposed upon the picture developed by camera 31. Controls 37 and 38 adjust the focus in cameras 31 and 32 while controls 36 and 40 are used to adjust the density of the images produced by each of the cameras 31 and 32. These controls are conveniently arranged on a control panel located adjacent to one of the display monitors so that the cameras can be adjusted while observing the resulting picture on the display monitor. The monitors themselves have conventional brightness and contrast controls so that the resulting picture can be presented in the most desirable manner.

In addition to registration, the sweep circuits in the two cameras must be synchronized so that lines and frames will be scanned simultaneously. This is accomplished in the system illustrated in FIG. 2 by connecting a separate synchronizing circuit 29 to the sweep circuits in cameras 31 and 32 so that the sweep circuit in camera 32 will be synchronized with the sweep circuit in camera 31. The output signal from the cameras contains the necessary elements to properly synchronize the monitor. However, this system is not limited to this method of synchronization and any of the many available methods of synchronizing a plurality of television cameras known to those skilled in the art can be used.

In operation the X-ray negatives are placed on light boxes 1 and 2 of FIG. 1 and mechanically positioned so that they are as to close to perfect registration as possible. The focus is perfected by means of controls 37 and 38 on control panel 43 of FIG. 2. Final registration is achieved by means of the electrical registration controls 33, 34, 39 and 35 on control panel 43 or by means of the mechanical controls 3, 4, 5, 6, 7 and 8 located on light boxes 1 and 2. The density of the pictures from each of the cameras is adjusted by means of the controls 36 and 40 on control panel 43 for the desired density of each of the signals from cameras 31 and 32. The brightness and contrast controls 47 and 48 on the monitors are adjusted for a desired picture. If it is not possible to achieve the desired degree of registration or density throughout the entire picture one portion of the picture may be observed while it is in registration and of the correct density and then a nearby portion of the picture may be observed by changing the registration and density of that portion so that it is in the best possible condition for viewing. Since these changes can be made quickly and easily by means of the controls available to the operator X-ray pictures which were not good enough to be successfully used by the former photographic technique can now be used and in addition examinations which were not considered possible by means of the photographic technique can be successfully carried out by means of the system disclosed in this invention.

FIG. 3, shows the output signals from one camera, for example camera 31, which is of the normal polarity. Pulse 3a is the synchronization pulse and pulses 3b, 3c and 3d are the pulses representing picture areas on the X-ray negative. In FIG. 4, the output signals from camera 32 which are of reversed polarity from those normally produced by a television camera, are shown. Pulse 4a is the synchronization pulse and is similar to the synchronization pulse 3a. Pulses 4b and 4d are pulses representing the picture area of the X-ray negative viewed by camera 32. It should be noted that the picture area 3c, on the output signal shown in FIG. 3, is not present in FIG. 4, while picture areas b and d are common to both signals. FIG. 5, shows the composite signal with results from the addition of the signals shown in FIGS. 3 and 4. The reversed polarity signals of FIG. 4 cancel the similar areas shown in FIG. 3 and since pulse c is not common to both pictures it is the only signal present. FIG. 7a illustrates the signal shown in FIG. 3 and FIG. 7b, illustrates the signal shown in FIG. 4 as they would appear on the display monitor if shown separately. FIG. 7c, illustrates the appearance of the mixed composite signal shown in FIG. 5. The picture element which is not common to each of the negatives 5c is the only picture element left in the composite signal, and thus appears on the monitor as a black line against a gray background in the example shown in FIG. 7c. By reversing the polarity of the output signals shown in FIGS. 3 and 4 a white line against a dark background can be obtained.

FIG. 8 illustrates another embodiment of this invention wherein only one camera is used. By using one camera the registration problem arising because of the mechanical and electrical differences between two cameras are no longer present. X-ray negatives 60 and 61 are placed on light boxes 62 and 63 as before. The light passing through X-ray negative 60 goes through a shutter opening 66 and is reflected from full silvered mirror 70 to half silvered mirror 73 to the camera lens 74 where it is focused by lens 74 upon the pick up tube. The light from X-ray negative 61 passes through shutter opening 68 through half silvered mirror 73 to lens 74. Shutter 67 is positioned so that it may be moved to intercept the light passing through shutter opening 66 while shutter 69 is positioned so that it may be moved to intercept the light passing through shutter opening 68. Shutters 67 and 69 are mechanically coupled so that when one of the shutter openings is blocked by a shutter the other shutter opening is unblocked and light will pass through that shutter opening. In the example shown in FIG. 8 shutter opening 68 is blocked by shutter 69 while shutter opening 66 is unobstructed and light passes through the shutter opening to the camera lens. When the light from an X-ray negative strikes the camera tube sweep circuits in the camera sweep over the resulting picture and change the light intensities to an electrical signal in a conventional manner well known to those in the television art. Upon completion of a single field, shutter 67 is positioned to block the shutter opening 66 while shutter 69 is removed from its position where it blocks the shutter opening 68 and the X-ray negative 61 is now viewed by the camera. At the completion of one field the shutters are again reversed and X-ray negative 60 is again viewed by the camera. A synchronization signal is coupled from camera 75 to shutter actuator 76 to properly position the shutters across the shutter openings. Thus alternate fields of the video signal appearing at the output of camera 75 consists of electrical signals comprising picture X-ray negative 60 and X-ray negative 61.

The output of camera 75 is connected to either a positive amplifier 80 or negative amplifier 81 through electronic switch 79. Electronic switch 79 is electrically coupled to shutter actuator 76 so that the signal comprising X-ray negative 60 will be directed to one of the two amplifiers 80 or 81 while the signal comprising X-ray picture 61 will be directed to the other amplifier. The positive amplifier 80 produces a video signal having the proper polarity to form a normal positive picture on a monitor while the signal from the negative amplifier 81 is reversed to form a negative picture as previously described. These signals are combined in mixer 82 to form a composite signal where the signals representing X-ray negatives 60 and 61 alternately follow each other in time. The display monitors 83 and 84 are similar to the display monitors previously described and are connected to mixer 82.

Controls are provided to separately control the electrical characteristics of the signals appearing in amplifiers 80 and 81. These controls 77 and 78 are located on control panel 72 which is connected to amplifiers 80 and 81. Control 77 adjusts the density of the signal in amplifier 80 and control 78 adjusts the density of the signal appearing in amplifier 81.

The combined signal appearing at mixer 82 is not the resultant of mixing the signals from X-ray pictures 60 and 61 wherein the portions of the signal which are common to both pictures have been reduced to a substantially constant level as shown in FIG. 5 but they consist of alternate fields of the signal resulting from the pictures 60 and 61. This composite video signal from mixer 82 is shown in FIG. 6. FIG. 6a represents the synchronization signal and it is substantially similar to the synchronization signal appearing in FIGS. 3, 4 and 5. Picture areas 6b and 6d are similar to the picture areas 3b and 3d while picture areas 6e and 6f are similar to the picture areas 4b and 4d. Picture area 6c is similar to picture area 3c. The composite video signal shown in FIG. 6 is projected by the display monitor as alternate fields of black on white and white on black as shown in FIGS. 7a and 7b. The areas which are common to both X-ray negatives 60 and 61 appear alternately as black and white areas on the display monitors while the picture areas which are not common appear either as a dark or a light portion in each frame. Because of the persistence of vision of the eye those areas which alternate between dark and light reduce to a substantially constant gray while the areas which remain one tone from frame to frame stand out in that tone.

The operation of this second embodiment is similar to that of the first embodiment except that there need be no adjustments because of differences in the two cameras. The X-ray pictures 60 and 61 are placed on the light boxes 62 and 63 and mechanically positioned until their images are superimposed as shown by the display monitor. The focus and density controls of the camera are set for the desired density of the resulting signal and the brightness and contrast controls of the display monitors are adjusted for the desired picture.

Figure 9:
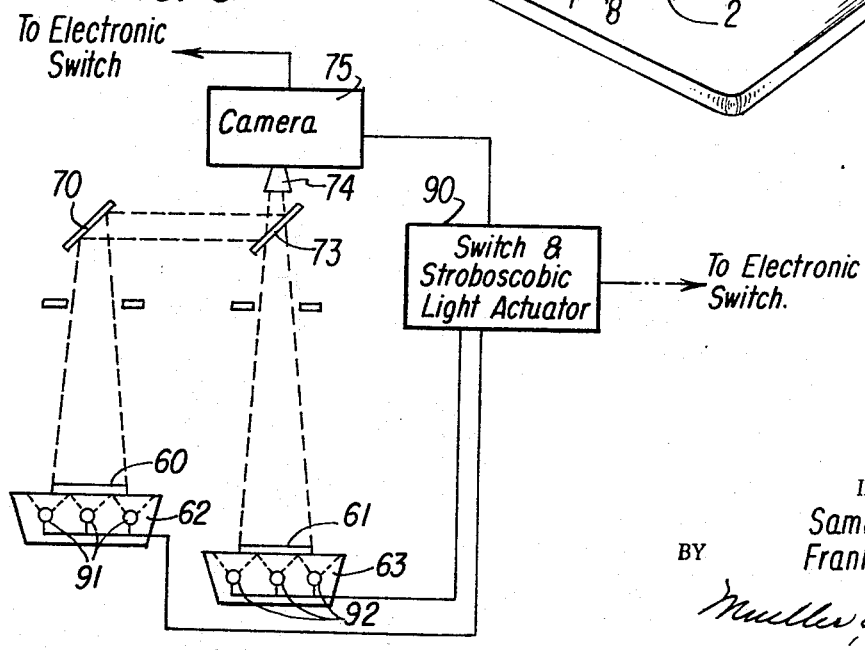
FIG. 9 illustrates a third embodiment of the invention wherein one camera is used.

FIG. 9 illustrates another embodiment of this invention wherein only one camera is used. X-ray negatives 60 and 61 are placed on light boxes 62 and 63 as before. The light from negative 60 is directed to the camera 75 by means of mirror 70 and half-silvered mirror 73. Negative 61 is viewed by camera 75 through the half-silvered mirror 73. The negatives 60 and 61 are alternately illuminated by stroboscopic lamps 91 and 92 which are controlled by the electronic switch and stroboscopic light actuator 90. The actuator 90 receives synchronization pulses from camera 75 so that the proper set of lamps will be turned on. The output of camera 75 is connected to the electronic switch 79 as shown in FIG. 8. The operation of the electronic switch 79 of FIG. 8, is controlled by actuator 90 of FIG. 9 so that the camera output will be connected to the desired amplifier. The remainder of the system is shown in FIG. 8 and was described previously.

This invention provides therefore an improved method of carrying out an examination of X-ray negatives by converting these negatives to electrical signals and mixing the signals so as to produce a composite picture in which areas common to both X-ray negatives are reduced to a substantially constant level of gray in the resulting picture.

What is claimed is:

1. A method of conducting an X-ray examination of a subject during which a contrast medium is injected into the subject, said method including the steps of:
    (a) taking a first X-ray photograph of the subject prior to the injection of the contrast medium,
    (b) taking a similar second X-ray photograph of the subject after the injection of the contrast medium,
    (c) positioning said first X-ray photograph before a first television camera and said second X-ray photograph before a second television camera,
    (d) converting said first X-ray photograph into a first electrical signal by means of said first television camera and converting said second X-ray photograph into a second electrical signal by means of said second television camera,
    (e) reversing the polarity of one of said first and second electrical signals to form a negative picture,
    (f) combining said one reversed polarity electrical signal and the other electrical signal to form a composite electrical signal,
    (g) providing a television reproduction of said composite electrical signal, and
    (h) positioning one of said first and second X-ray photographs so that said composite electrical signal represents said first and second X-ray photographs exactly superimposed.

2. A method of conducting an X-ray examination of a subject during which a contrast medium is injected into the subject, said method including the steps of:
    (a) taking a first X-ray photograph of the subject prior to the injection of the contrast medium,
    (b) taking a similar second X-ray photograph of the subject after the injection of the contrast medium,
    (c) positioning said first X-ray photograph before a first television camera and said second X-ray photograph before a second television camera,
    (d) converting said first X-ray photograph into a first electrical signal by means of said first television camera and converting said second X-ray photograph into a second electrical signal by means of said second television camera,
    (e) separately controlling the electrical characteristics of each of said first and second electrical signals,
    (f) reversing the polarity of one of said first and second electrical signals to form a negative picture,
    (g) combining said one reversed polarity electrical signal and the other electrical signal to form a composite electrical signal,
    (h) providing a television reproduction of said composite electrical signal, and
    (i) positioning one of said first and second X-ray photographs so that said composite electrical signal represents said first and second X-ray photographs exactly superimposed.

3. A method of conducting an X-ray examination of a subject during which a contrast medium is injected into the subject, said method including the steps of:
    (a) taking a first X-ray photograph of the subject prior to the injection of the contrast medium,
    (b) taking a similar second X-ray photograph of the subject after the injection of the contrast medium,
    (c) positioning said first X-ray photograph before a first television camera and said second X-ray photograph before a second television camera,
    (d) converting said first X-ray photograph into a first electrical signal by means of said first television camera and converting said second X-ray photograph into a second electrical signal by means of said second television camera,
    (e) reversing the polarity of one of said first and second electrical signals to form a negative picture,
    (f) combining said one reversed polarity electrical signal and the other electrical signal to form a composite electrical signal,
    (g) transmitting said composite signal to a plurality of separate locations,
    (h) providing a television reproduction of said composite electrical signal at each of said plurality of separate locations, and
    (i) positioning one of said first and second X-ray photographs so that said composite electrical signal represents said first and second X-ray photographs exactly superimposed.

4. A method of conducting an X-ray examination of a subject during which a contrast medium is injected into the subject, said method including the steps of:
    (a) taking a first X-ray photograph of the subject prior to the injection of the contrast medium,
    (b) taking a similar second X-ray photograph of the subject after the injection of the contrast medium,
    (c) positioning said first X-ray photograph before a first television camera and said second X-ray photograph before a second television camera,
    (d) optically magnifying each of said first and second X-ray photographs,
    (e) converting said magnified first X-ray photograph into a first electrical signal by means of said first television camera and converting said magnified second X-ray photograph into a second electrical signal by means of said second television camera,
    (f) reversing the polarity of one of said first and second electrical signals to form a negative picture,
    (g) combining said one reversed polarity electrical signal and the other electrical signal to form a composite electrical signal,
    (h) providing a television reproduction of said composite electrical signal, and
    (i) positioning one of said first and second X-ray photographs so that said composite electrical signal represents said first and second X-ray photographs exactly superimposed.

References Cited by the Examiner

UNITED STATES PATENTS 2,933,008   4/1960   Barnett _____ 178—61

DAVID G. REDINBAUGH, *Primary Examiner.*

J. A. ORSINO, *Assistant Examiner.*